United States Patent
Etter et al.

(10) Patent No.: US 9,763,004 B2
(45) Date of Patent: Sep. 12, 2017

(54) SYSTEMS AND METHODS FOR AUDIO CONFERENCING

(71) Applicant: Alcatel Lucent, Paris (FR)

(72) Inventors: Walter Etter, Wayside, NJ (US); Rabih Abou-Chakra, Chatenay-Malabry (FR); Abdelkrim Moulehiawy, Paris (FR)

(73) Assignee: Alcatel Lucent, Boulogne-Billancourt (FR)

( * ) Notice: Subject to any disclaimer, the term of this patent is extended or adjusted under 35 U.S.C. 154(b) by 323 days.

(21) Appl. No.: 14/028,633

(22) Filed: Sep. 17, 2013

(65) Prior Publication Data

US 2015/0078581 A1    Mar. 19, 2015

(51) Int. Cl.
*H04R 3/00*    (2006.01)
*H04M 3/56*    (2006.01)

(52) U.S. Cl.
CPC ............ *H04R 3/005* (2013.01); *H04M 3/568* (2013.01)

(58) Field of Classification Search
USPC ....................................................... 348/14.07
See application file for complete search history.

(56) References Cited

U.S. PATENT DOCUMENTS

| | | | |
|---|---|---|---|
| 7,190,775 B2 * | 3/2007 | Rambo ................... | H04M 9/10 379/202.01 |
| 7,415,117 B2 | 8/2008 | Tashev et al. | |
| 7,853,649 B2 | 12/2010 | Lee et al. | |
| 8,073,125 B2 | 12/2011 | Zhang et al. | |
| 2005/0147261 A1 | 7/2005 | Yeh | |
| 2008/0189112 A1 * | 8/2008 | Cohen ..................... | G10L 17/00 704/260 |
| 2009/0264114 A1 * | 10/2009 | Virolainen .............. | H04M 3/56 455/416 |

FOREIGN PATENT DOCUMENTS

| EP | 1206161 A1 | 5/2002 |
|---|---|---|
| EP | 1551205 B1 | 8/2008 |

* cited by examiner

*Primary Examiner* — Amal Zenati
(74) *Attorney, Agent, or Firm* — Niraj A. Desai

(57) ABSTRACT

Systems and methods for enabling an audio conference are provided. In one aspect, a system includes a transmitting device which receives audio signals representing sounds captured by at least two microphones from participants situated at a first location. A time-of-arrival delay between at least two of the audio signals is calculated and a beam-formed monaural audio signal and corresponding spatial data are generated and transmitted to remote participants situated at a second location. A receiving device processes the beam-formed monaural audio signal based on the spatial data to render and output spatial audio via speakers to the remote participants at the second location. In various aspects, the spatial data may include an angular value or a participant identifier that are determined based on the time-of-arrival delay. The spatial data may also indicate a total number of conference participants that are detected at the first location.

25 Claims, 5 Drawing Sheets

SYSTEMS AND METHODS FOR AUDIO CONFERENCING

TECHNICAL FIELD

The present disclosure is directed towards communication systems. More particularly, it is directed towards systems and methods for generating and rendering audio data in an audio conference.

BACKGROUND

This section introduces aspects that may be helpful in facilitating a better understanding of the systems and methods disclosed herein. Accordingly, the statements of this section are to be read in this light and are not to be understood or interpreted as admissions about what is or is not in the prior art.

A conferencing system is an example of a communication system that enables audio, video and/or data to be transmitted and received in a remote conference between two or more participants that are located in different geographical locations. While conferencing systems advantageously enable live audio collaboration between parties that are remotely situated, systems and methods that enhance the audible experience of the participants collaborating in a conference are desirable.

BRIEF SUMMARY

Systems and methods for enabling a spatial audio conference between conference participants situated at remote locations are provided.

In one aspect, a time-of-arrival delay is determined between at least a first audio signal generated by a first microphone and at least a second audio signal generated by a second microphone in response to sounds captured by at least the first microphone and the second microphone from conference participants situated at a first location of the audio conference. A third audio signal is generated based on at least the first audio signal and the second audio signal, and the determined time-of-arrival delay. Additionally, spatial data for rendering a spatial audio signal at the second location is generated and associated with the third audio signal based on the determined time-of-arrival delay. The third audio signal and the spatial data are transmitted to the second location over a network for rendering spatial audio to one or more conference participants that are situated at the second location.

In one aspect, the time-of-arrival delay is determined by computing a cross-correlation between at least the first audio signal and the second audio signal.

In various aspects, the third audio signal is a beam-formed monaural audio signal that is generated by combining at least the first audio signal and the second audio signal based on the time-of-arrival delay.

In various aspects, the generated spatial data includes an angular value, a conference-participant identifier, or a count of conference-participants detected at the first location.

In one aspect, the count of the conference-participants is determined by detecting a number of changes in the time-of-arrival delay or an angular value that is derived from the time-of-arrival delay.

In another aspect, the system and method further includes receiving the third audio signal and the spatial data at the second location, rendering a spatial audio signal based on the third audio signal and the spatial data, and outputting the spatial audio signal via speakers to one or more conference participants situated at the second location.

In various aspects, the spatial audio signal is rendered at the second location based on the angular value, the conference participant identifier, or the count of conference participants that are included in the spatial data received from the first location.

DETAILED DESCRIPTION

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

Figure 1:
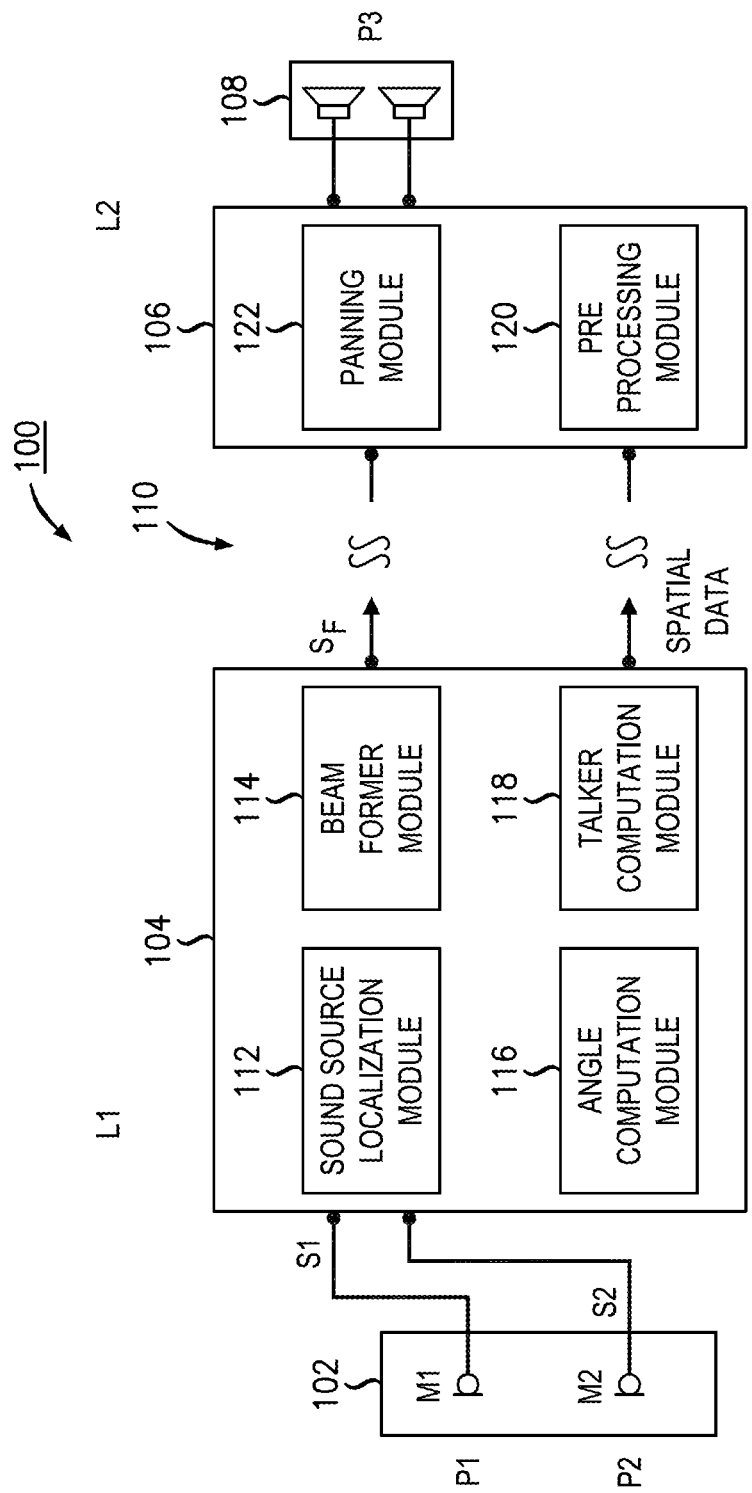
FIG. 1 illustrates an example of an audio conference system 100 for generating, transmitting, and receiving an audio signal and corresponding spatial data in accordance with an aspect of the disclosure.

FIG. 1 illustrates a simplified embodiment of a audio conferencing system 100 (hereinafter, "system 100") for enabling an audio conference between, for example, participants P1, P2 that are co-located in a first geographical location (location L1) and a remote participant P3 that is located in a second geographical location (location L2). The locations L1, L2 may be any geographically remote locations. For example, locations L1 and L2 may be different conference rooms in a building or campus. Alternatively, location L1 may be a conference room in an office building in one city while location L2 may be a home office or a conference room in another city, state, or country. While only two remote locations are illustrated in FIG. 1 for ease of understanding, system 100 may be extended to any number of locations, each of which may have a party of one or more participants that are co-located at the respective locations.

System 100 includes an array of microphones 102 including at least two microphones $M_1$, $M_2$, and a processing device 104 that are co-located at location L1. System 100 further includes a processing device 106 and speakers 108 that are co-located at location L2. The processing device 104 of location L1 and the processing device 106 of location L2 are communicatively interconnected with each other via network 110, thus enabling transmission or reception of information (e.g., audio data, spatial data, or other type of data) between location L1 and location L2. While only a few components are shown in the example of FIG. 1, system 100 may also include other interconnected devices such as routers, gateways, access points, switches, servers, and other components or devices that are typically employed for enabling communication over a network.

Processing devices 104, 106 may be any processor based computing devices that are configured using hardware, software, or combination thereof to function in accordance with the principles described further below. Some examples of computing devices suitable for use as processing devices 104, 106 include a personal computer ("PC"), a laptop, a smart phone, a personal digital assistant ("PDA"), a tablet, a wireless handheld device, a set-top box, a gaming console, a camera, a TV, a projector, and a conference hub/bridge.

Processing devices 104, 106 may be configured to communicate with each other over the network 110 (which may be a collection of networks) using one or more network protocols. Some examples of network protocols include wireless communication protocols such as 802.11a/b/g/n, Bluetooth, or WiMAX; transport protocols such as Transfer Control Protocol ("TCP"), Real-time Transport Protocol ("RTP"), RTP Control protocol ("RTCP"), or User Datagram Protocol ("UDP"); Internet layer protocols such as the Internet Protocol ("IP"); application-level protocols such as Hyper Text Transfer Protocol ("HTTP"), Simple Message Service ("SMS") protocol, Simple Mail Transfer Protocol ("SMTP"), Internet Message Access Protocol ("IMAP"), Post Office Protocol ("POP"), Session Initiation Protocol ("SIP"), a combination of any of the aforementioned protocols, or any other type of communication protocol now known or later developed.

The network 110 may be any type of one or more wired or wireless networks. For example, the network 110 may be a Wide Area Network ("WAN") such as the Internet; a Local Area Network ("LAN") such as an intranet; a Personal Area Network ("PAN"), a satellite network, a cellular network, or any combination thereof. In addition to the foregoing, the network 108 may also include a telephone exchange network such as a Public Switched Telephone Network ("PSTN"), Private Branch Exchange ("PBX"), or Voice over IP ("VoIP") network, for example.

The at least two microphones $M_1$, $M_2$ of the microphone array 102 may be omni-directional microphones that respectively generate an audio signal (audio signal $S_1$ and audio signal $S_2$ in FIG. 1) based on articulated sounds (e.g., voice or speech) that are captured within the sound capture field of the microphones from the conference participants (e.g., participants P1, P2) at location L1.

The at least two microphones $M_1$, $M_2$ of the microphone array 102 may be distributed at various spots in location L1 for capturing sounds articulated by the participants P1, P2 during the audio conference. While there are advantages in distributing the microphones of the microphone array 102 based on size or layout of a pertinent location, this is not a limitation. In another aspect, the microphones of the microphone array 102 may also be integrated into the processing device 104 which may be centrally placed, for example, in a conference room.

The number of the microphones of the microphone array 102 may vary based on the desired size of the sound capture field or based on the desired spatial accuracy or resolution of the microphone array 102. For example, two, three or four microphones may be enough to provide suitable resolution sound capture field in a small conference room, while an even greater number of microphones may be utilized for larger spaces or where a greater spatial resolution is desired in a given location as will be appreciated by one of ordinary skill in the art.

The speakers 108 may be any type of conventional speakers. For example, the speakers 108 may be standalone stereo loudspeakers that are distributed at location L2. The speakers 108 may also be configured as multi-channel surround sound speakers. In one aspect, speakers 108 may be one or more sets of headphone speakers that are utilized or worn by, for example, one or more of the conference participants situated at location L2. In another aspect, the speakers 108 may also be integrated into the processing device 106, which may be appropriately placed or located in the general proximity of the conference participant(s) at location L2.

Processing device 104 is configured to process the audio signals $S_1$, $S_2$ that are respectively received from the microphones $M_1$, $M_2$, of the microphone array 102 and to produce beam-formed monaural audio signals based on the sounds captured by the microphones. In addition, processing device 104 is further configured to determine corresponding spatial data associated with the beam-formed monaural audio signals that are generated based on the captured sounds, as discussed in greater detail below. The beam-formed monaural audio signals along with the spatial data are transmitted by the processing device 104 to the processing device 106 over the network 110.

The processing device 106, in turn, is configured to receive the beam-formed monaural audio signals and the spatial data, and to render spatial audio signals to the conference participant P3 situated at location L2 via speakers 108, as discussed in greater detail below. In general, the spatial data generated by the processing device 104 enables the processing device 106 to render spatial audio signals via speakers 108 such that the conference participants at receiving locations (e.g., participant P3 at location L2) are able to spatially distinguish the sounds articulated by the different speaking participants at the transmitting locations (e.g., participant P1 and P2 at location L1), even though the sounds are transmitted as monaural audio signals from the transmitting locations to the receiving locations.

Since processing device 104 is configured to transmit beam-formed audio signals and spatial data from location L1 to one or more other receiving locations (e.g., location L2) of the conference using one or more networking protocols, processing device 104 is also referenced herein as the transmitting device. On the other hand, since processing device 106 is configured to receive the beam-formed audio signals and the spatial data from one or more of the transmitting locations (e.g., location L1) and to render spatial audio signals via speakers 108 at location L2 using one or more networking protocols, the processing device 106 is also referenced herein as the receiving device. However, it will be understood that in practice processing devices at each (or any) of the conference locations may be configured as both a transmitting device and a receiving device, and that each conference location may also be configured with the microphone array 102 and the speakers 108, in order to enable bi-directional transmission and reception of audio signals and spatial data at each respective location participating in accordance with the principles disclosed herein.

Prior to describing an operation of the system 100 illustrated in FIG. 1, an explanation of sound capture by the microphones of the microphone array 102 is provided. Assume, for example, that a participant (e.g., P1 or P2) is speaking at location L1. The microphones of the microphone array 102 may be arranged such that the sounds articulated by the speaking participant are captured by at least two of the microphones (e.g., $M_1$, $M_2$) of the microphone array 102, which microphones, as noted above, respectively generate an audio signal $S_1$ and an audio signal $S_2$ based on the captured sounds. In cases where the sounds articulated by the speaking participant are captured by two or more microphones of the microphone array 102 as described above, it is likely that the articulated sounds arrive earlier in time at one of the microphones (e.g., $M_1$) of the microphone array 102 relative to some other microphones (e.g., $M_2$) of the microphone array 102. Such situation typically arises, for example, where the speaking participant is in somewhat closer physical proximity to one microphone (e.g., $M_1$) relative to other microphones of the microphone array 102 (e.g., $M_2$), such that the distance (and time) the sounds articulated by the speaking participant take to reach one microphone is less than the distance (and time) taken to reach other microphones. As a result, at least one of the audio signals $S_1$, $S_2$ that are respectively generated by the microphones $M_1$, $M_2$ can be expected to be a time-delayed version of the other audio signal by a time-of-arrival delay corresponding to the extra time it takes for the sounds articulated by the speaking participant to reach a particular one of the microphones relative to the other microphone.

The above description extends to the situation where the microphone array includes more than the two microphones $M_1$, $M_2$ that are shown in FIG. 1. For instance, in the case where the microphone array 102 includes N microphones $M_1$, $M_2$ . . . $M_N$ that each capture sounds articulated by participant P1 or participant P2 at location L1, the audio signals $S_1$, $S_2$ . . . $S_N$ that are respectively generated by the microphones in response to the captured sounds can be expected to be various time-delayed versions of an audio signal that is received by the microphone that is, for example, closest to the speaking participant. Thus, it will be appreciated that although the operation of the system 100 of FIG. 1 is described below in the context of two microphones ($M_1$ and $M_2$,) the principles of the present disclosure extend to any number of microphones $M_1$, $M_2$ . . . $M_N$.

Figure 2:
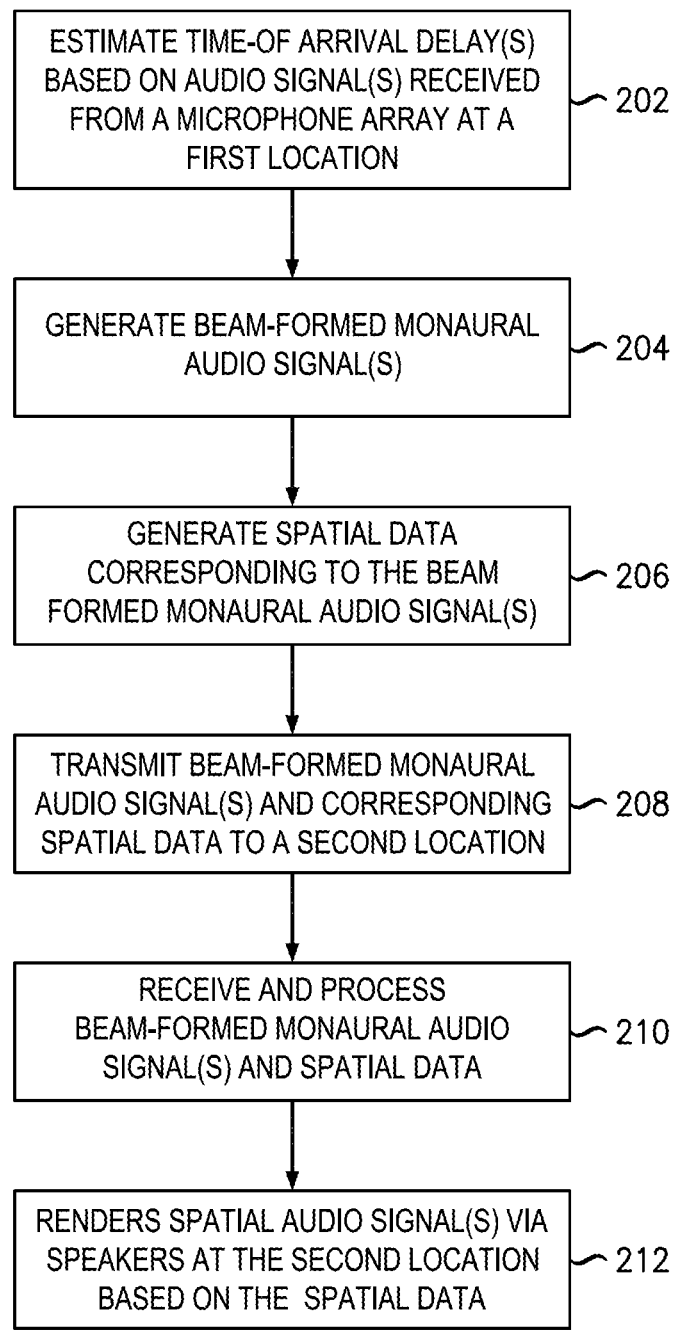
FIG. 2 illustrates an example of a process flow diagram in accordance with an aspect of the disclosure.

An example operation of system 100 of FIG. 1 is now described in conjunction with the process 200 of FIG. 2. As shown in FIG. 1, the processing device 104, as the transmitting device, includes a sound-source localization module 112, a beam-former module 114, an angle-computation module 116, and a talker-computation module 118. Collectively, the modules 112-118 configure the processing device 104 as a transmitting device for transmitting beam-formed audio signals and spatial data from location L1 to location L2 as noted previously. While the modules 112-118 are illustrated in FIG. 1 as separate modules, in another embodiment the functionality of any of the modules 112-118 may be integrated or combined with another one or more of the modules.

In step 202, the sound-source localization module 112 calculates time-of-arrival delay(s) for the audio signals $S_1$, $S_2$ that are respectively received from the microphones $M_1$, $M_2$ of the microphone array 102 based on sounds articulated by the speaking participant (e.g., P1 or P2) at location L1. The sound-source localization module 112 may calculate the time-of-arrival delay in several ways.

In one aspect, the sound-source localization module 112 estimates a time-of-arrival delay by performing a cross-correlation on audio signal $S_1$ received from microphone $M_1$ and audio signal $S_2$ received from microphone $M_2$. Where, for example, the audio signal $S_2$ is a time-delayed version of audio signal $S_1$ (or vice versa), the cross-correlation computation may be determined to result in a large correlation value (for example, greater than or equal to 0.8) when either one of the signals $S_1$, $S_2$ is appropriately shifted in time by a time-value substantially reflecting the time-of-arrival delay between microphone $M_1$ and microphone $M_2$. Such cross-correlation between the audio signals $S_1$ and $S_2$ may be computed by the sound-source localization module 112 based on signal processing performed in the time domain, the frequency domain, or a combination thereof, in order to localize the source of the sounds with respect to the microphones of the microphone array 102.

In other aspects, the time-of-arrival delay may also be estimated by performing phase calculations, energy or power calculations, linear interpolations, or by using other types of signal processing methods or algorithms for determining the characteristics of the audio signals as will be understood by those with skill in the art.

In step 204, the beam-former module 114 produces a beam-formed monaural audio signal based on the audio signals $S_1$, $S_2$ that are received from the microphones $M_1$, $M_2$ of the microphone array 102, and the estimated time-of-arrival delay that are determined for the received audio signals by the sound-source localization module 112. The resulting beam-formed audio signal is generated such that it effectively increases the sensitivity of the omni-directional microphones $M_1$, $M_2$ towards sounds received from the direction of the speaking participant, while eliminating or reducing the sensitivity of the omni-directional microphones to sounds (e.g., noise) received from other directions. Since the estimated time-of-arrival delay is used to steer the sensitivity of the microphone array towards the source of the sounds and in the direction of the speaking participant, the time-of-arrival delay is also referred to as the steering delay.

Figure 3A:
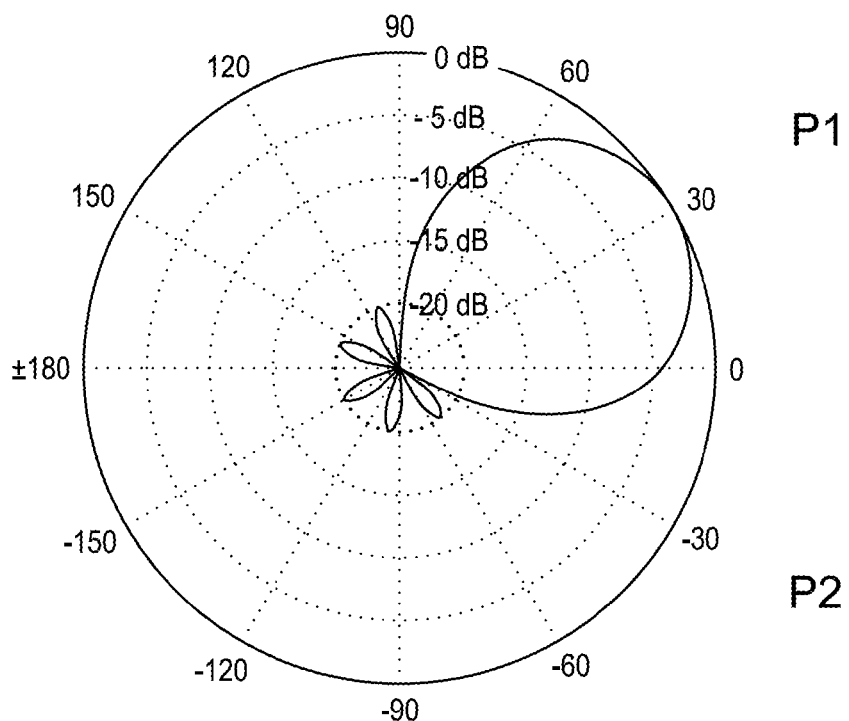
FIGS. 3A and 3B illustrate an example of steering audio signals of microphone array in accordance with an aspect of the disclosure.

FIG. 3A illustrates an example of increasing the sensitivity of a microphone array in the direction of participant P1 based on an array of four microphones (N=4) which generate four audio signals that are beam-formed towards the direction of participant P1 by the processing device 104 when participant P1 is speaking at location L1. Similarly, FIG. 3B illustrates an example of increasing the sensitivity of the microphone array in the direction of participant P2 as the speaking participant based on an array of four microphones which generate four audio signals that are beam-formed towards the direction of participant P2 by the processing device 104 when participant P2 is speaking at location L1.

Figure 3B:
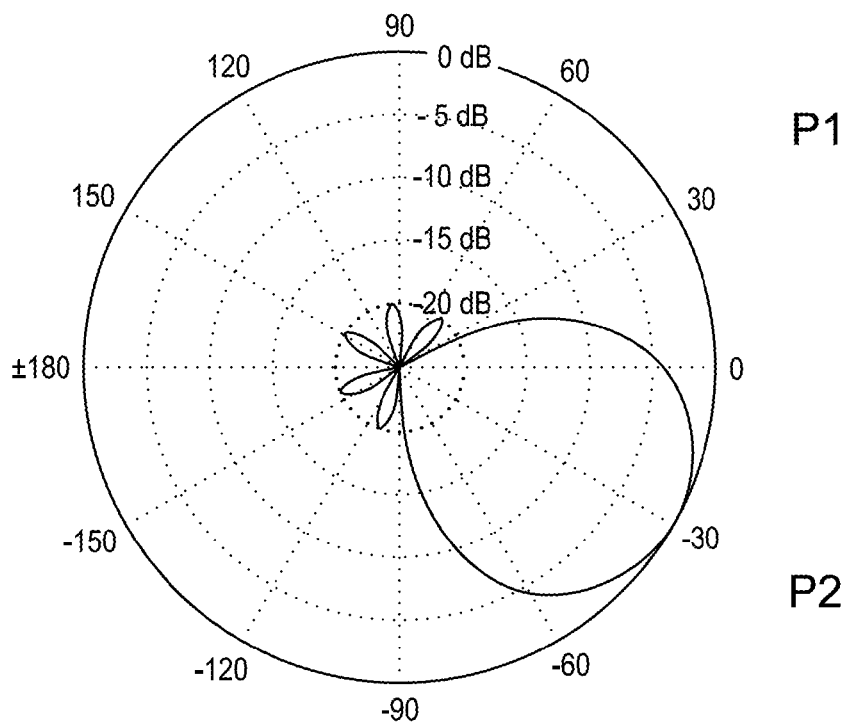

As shown in FIGS. 3A and 3B, the beam-formed audio signal generated by the beam-former module 114 may include a relatively high-amplitude main lobe 302 that is biased towards the direction of the sounds articulated by the speaking participant (participant P1 or P2). The beam-formed audio signals may also include one or more lower amplitude side-lobes 304, which may capture sounds from directions other than the direction of the speaking participant.

The size and shape of the main lobe 302 or the side lobes 304 may be adjusted in several ways. In one aspect, for example, the number N of the microphones in the microphone array 102 may be increased for higher directional resolution and a greater signal-to-noise ratio between the main lobe 302 and any side lobes 304. Alternatively, or in addition, the audio signals produced by the N microphones may also be filtered, amplified, or otherwise processed to achieve the desired size, shape, or signal-to-noise ratio, as will be understood by those of skill in the art.

The beam-former module 114 may be implemented in several ways. In one aspect, for example, the beam-former module 114 may be implemented as a delay-and-sum beam-former. In this case, the beam-former module 114 may generate a monaural beam-formed audio signal $s_F$ by, for example, summing the audio signals produced by the microphone array after shifting one or more of the audio signals by appropriate time-of-arrival delays. For example the beam-former module 114 may sum audio signal $S_1$ with the audio signal $S_2$ after delaying audio signal $S_1$ or audio signal $S_2$ based on the estimated time-of-arrival delay calculated by the sound-source localization module 112. In other aspects, the beam-former module 114 may be implemented as a weighted-pattern beam-former or an adaptive beam-former configured to dynamically adjust the signal-to-noise ratio of the beam-formed audio signal $s_F$ and the size, shape or number of side-lobes 304 illustrated in FIGS. 3A and 3B using adaptive signal processing techniques. In all cases, the beam-former module 114 may generate a desired monaural beam-formed audio signal $s_F$ that is biased towards the speaking participant at location L1 based on the audio signals $S_1$ and $S_2$ that are received from the microphone array 102 and the calculated estimate of the corresponding time-of-arrival delay.

In step 206, the processing device 104 generates spatial data corresponding with the generated monaural beam-formed audio signal(s). The spatial data is determined based on whether the sensitivity of the microphone array 102 was effectively steered towards participant P1 or participant P2 as the speaking participant to produce a monaural beam-formed audio signal $s_F$ during, for example, a given period of time. Aspects describing various spatial data and its use are now discussed below.

In one aspect, the spatial data generated at step 206 may include an angular value that is determined by the angle-computation module 116. The angle-computation module 116 may determine the angular value based on the same steering delay that is used by the beam-former module 114 to generate the monaural beam-formed audio signal $s_F$. The generated angular value may thus be understood as the particular steering angle towards which the sensitivity of the microphone array is steered when participant P1 or P2 is the speaking participant. The steering angle may be computed as a normalized value with respect to a predetermined axis of the microphone array 102.

For example, in the system 100 shown in FIG. 1, assuming that the sounds articulated by participants P1 and P2 at location L1 are captured at the microphone array 102 as planar waves, the angular value ϕ representing the angular direction of the source of the captured sounds with respect to the microphone array 102 may be determined based on the estimated steering delay using the equation:

$$\phi = \arcsin\left(\frac{c \cdot \tau}{D}\right)$$

Where, in the equation above, ϕ represents the angular direction of the source of the captured sounds, c is the speed of sound, τ is the calculated time-of-arrival or steering delay between audio signal $S_1$ generated by microphone $M_1$ and audio signal $S_2$ generated by the microphone $M_2$ based on whether participant P1 or participant P2 is speaking at location L1, and D is the distance between microphone $M_1$ and microphone $M_2$.

Figure 4:
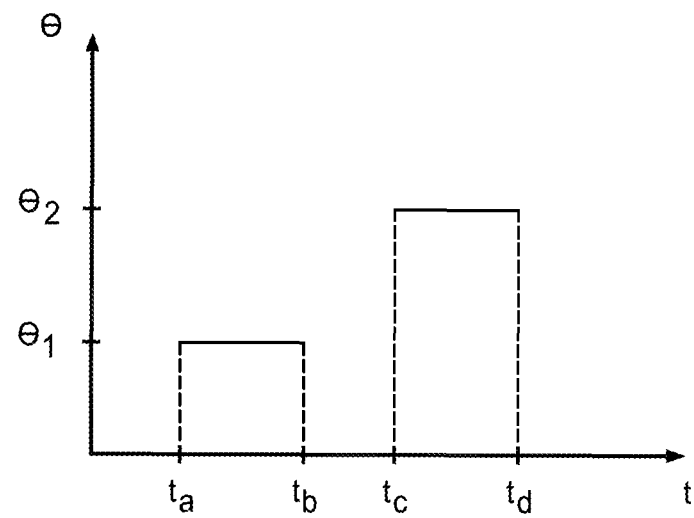
FIG. 4 illustrates one example of spatial data in accordance with an aspect of the disclosure.

FIG. 4 shows an example in which the angle-computation module 116 respectively determines two different angular values $\phi_1$, $\phi_2$, as part of the spatial data based on whether participant P1 or participant P2 is the speaking participant at location L1. For the purposes of this example, it is assumed here that participant P1 is the speaking participant during time $t_a$ to $t_b$ ("first time period"), and participant P2 is the speaking participant from time $t_c$ to $t_d$ ("second time period").

During time $t_a$ to $t_b$, the beam-former module 114 produces a first monaural beam-formed audio signal $s_{F1}$ by steering the sensitivity of the microphone array 102 towards participant P1 based on the audio signals $S_1$, $S_2$, and a first estimated steering delay that are determined based on the sounds articulated by participant P1 during the first time period. Furthermore, the angle-computation module 116 assigns a corresponding first angular value $\phi_1$ to the first monaural beam-formed audio signal $s_{F1}$ based on the determined first steering delay determined during the first time period as described above.

During time $t_c$ to $t_d$, the beam-former module 114 produces a second monaural beam-formed audio signal $s_{F2}$ by steering the sensitivity of the microphone array 102 towards participant P2 based on the audio signals $S_1$, $S_2$, and a second steering delay that are determined based on the sounds captured from participant P2 during the second time period. The angle-computation module 116 assigns a second angular value $\phi_2$ to the second monaural beam-formed audio signal $s_{F2}$ based on the second steering delay determined during the second time period.

In step 208, the monaural beam-formed audio signal(s) generated in step 204, and the corresponding spatial data generated in step 206, are transmitted by the processing device 104 to the processing device 106 via the network 110. Continuing the example above, the first monaural beam-formed audio signal $s_{F1}$ [$s_F(t)$, t=$t_a$ . . . $t_b$] along with the corresponding first angular value $\phi_1$ are transmitted (e.g., streamed or packetized) from the processing device 104 to the receiving device 106 over the network 110 for the first time period, and the second monaural beam-formed audio signal $s_{F2}$ [$s_F(t)$, t=$t_c$ . . . $t_d$] along with the corresponding second angular value $\phi_2$ may be transmitted from the processing device 104 to the receiving device 106 for the second time period.

In another aspect, the spatial data generated at step 206 may also include one or more participant identifiers that are determined by the talker-computation module 118. In one embodiment, for example, the talker-computation module 118 may determine the participant identifiers by mapping a unique value to each different angular value ϕ determined by the angle-computation module 116 during different time periods. In an alternative embodiment, the talker-computation module 118 may also determine the participant identifiers by mapping a unique value to each different steering delay value determined by the sound-source localization module 112 during different time periods.

Figure 5:
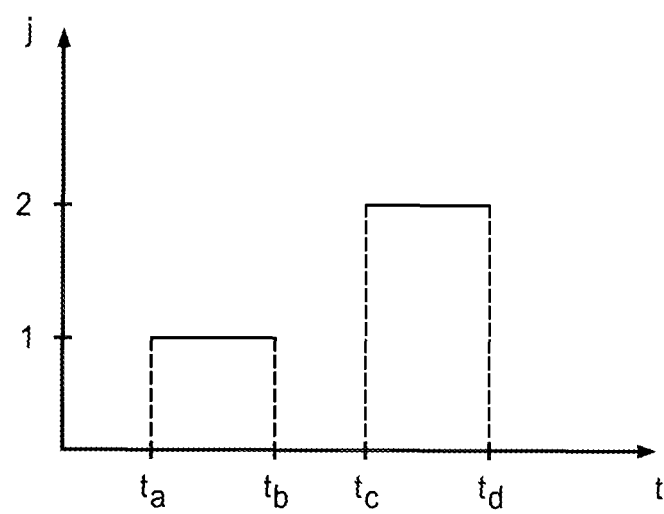
FIG. 5 illustrates another example of spatial data in accordance with an aspect of the disclosure.

Referring to FIG. 5 and continuing the example of FIG. 4, the talker-computation module 118 may map a participant identifier value of "1" as spatial data for the first time period $t_a$ to $t_b$ when participant P1 is the speaking participant based on the angular value $\phi_1$ determined by the angle-computation module 116. Similarly, the talker-computation module 118 may also map a participant identifier value of "2" as spatial data for the second time period $t_c$ to $t_d$ when participant P2 is the speaking participant based on the angular value $\phi_2$ determined by the angle-computation module 116.

In yet another embodiment, the talker computation module may not only determine participant identifiers by mapping pre-determined unique values to the angular values or the steering delay values as described above, but may also determine the actual identity of the participants situated at the transmitting location. The actual identity of the participants may be determined in several ways. In one aspect, for example, the actual identity that is determined may be based on voice recognition performed on the received audio signals. In another aspect, the actual identity that is determined may be based on facial recognition performed on one or more video signals that are received from a camera or cameras that are located at the transmitting location and interconnected with the transmitting device. In a particular embodiment, the camera or cameras may also be steered to acquire one or more images of the speaking participants based on the angular values or steering delays that are generated based on audio signals received from the microphone array. As with the participant identifiers, the actual identities of the participants may also be transmitted by the transmitting device to one or more receiving devices as part of the spatial data over the network.

The talker-computation module 118 may also maintain a running count of the total number of speaking participants that are detected at location L1 based on, for example, the different steering delays, angular values, participant identifier values that are determined during different time periods of the audio conference. The mapped participant identifier values, along with the running count of the total number of speaking participants may be transmitted as part of the spatial data, along with (or instead of) the angular values, from processing device 104 to processing device 106 over the network 110 in association with the monaural beam-formed audio signal produced by the beam-former module 114 as described above.

In step 210, the monaural beam-formed audio signal(s) and the corresponding spatial data are received by the processing device 106, and, in step 212, the processing device 106 uses the spatial data to spatially render the received monaural beam-formed audio signals, via speakers 108, to the participant P3 at location L3. As noted previously, the received beam-formed monaural audio signals are spatially rendered based on the spatial data such that participant P3 at location L2 perceives sounds rendered via the speakers 108 when participant P1 is the speaking participant as coming from a different direction than the direction from which sounds are output via the speakers 108 when participant P2 the speaking participant.

As shown in system 100 of FIG. 1, for example, the processing device 106 includes a pre-processing module 120 and a panning module 122. The pre-processing module 120 is configured to process the spatial data that is received by the processing device 106 and to provide directional data to the panning module 122 such that conference participants listening at location L2 are able to spatially (e.g., directionally) distinguish between the various speaking participants at location L1. The panning module 122 is configured to spatially render the beam-formed monaural audio signals via speakers 108 to the participants at location L2 based on the directional data received from the pre-processing module 120.

The pre-processing module 120 may process the spatial data to determine the directional data provided to the panning module 122 in multiple ways. In one aspect, the pre-processing module 120 may provide the angular values that are received as part of the spatial data as the directional data to the panning module. This embodiment may be considered to be a "true-mapping" of the received beam-formed monaural audio signals as the processing device 106 may render spatial audio signals such that the sounds output via the speakers 108 are perceived by the listening participants at location L2 to emanate from directions matching or substantially matching the directions from which the sounds are captured from the speaking participants at location L1.

In another aspect, the pre-processing module 120 may translate the angular values (or the speaker identifier values) that are received as part of the spatial data into virtual angular values that are provided as the directional data to the panning module. Such translation into virtual angular values may be advantageous to adjust the sounds that are spatially output via the speakers 108 based on, for example, listener position and orientation, which may be determined by optional sensor controls including visual sensors or other sensors.

Such translation may also be advantageous where mapped speaker identifier values (and/or actual speaker identities) are received as the spatial data or where the actual angular values that are received with respect to different speaking participants are separated by less than a minimum angular threshold, such that it may be more difficult for the listening participants to spatially distinguish between the speaking participants at one or more transmitting locations based on the actual angular values. The minimum angular threshold of separation between the speaking participants from each respective transmitting location may be based on the listener positions, a predetermined minimum separation value (e.g., 10 degrees, 20 degrees or the like), or may be provided as user input by the listening participants at location L2 to the pre-processing module 120.

The pre-processing module 120 may not only determine virtual angular values that satisfy a minimum degree of spatial separation for the sounds output via the speakers 108, but also those that provide the highest (or relatively highest) degree of possible spatial separation for each of the speaking participants in the audio conference. For example, the pre-processing module 120 may dynamically determine a maximum degree of angular separation that is possible by dividing the size of the speaker sound field (e.g., 180 degrees for a two speaker stereo configuration or 360 degrees for a surround-sound speaker configuration) by the aggregated total counts of speaking participants that are received as part of the spatial data from one or more transmitting locations of the audio conference. The pre-processing module 120 may then dynamically provide directional data to the panning module 122 such that the beam-formed monaural audio signals received from the respective speaking participants at one or more of the transmitting locations over the duration of the audio conference are spatially rendered by the panning module 122 via speakers 108 with the largest possible degree of spatial separation for the ease of understanding and convenience of the listening participants.

The systems and methods described in the present disclosure are believed to incur a number of advantages. For example, the systems and methods disclosed herein enable spatial audio conferencing between remote participants by transmitting a low-bandwidth (e.g., 64 kilobits per second) monaural audio signal instead of having to transmit stereo signals that typically require twice the bandwidth without providing rendering flexibility. Furthermore, beam-forming the monaural audio signal improves the signal-to-noise characteristics of the steered audio signals that are transmitted from one location to another. Yet further, the systems and methods disclosed herein may be advantageously employed with omni-directional microphones, which are typically cheaper and more prevalent than directional microphones.

Figure 6:
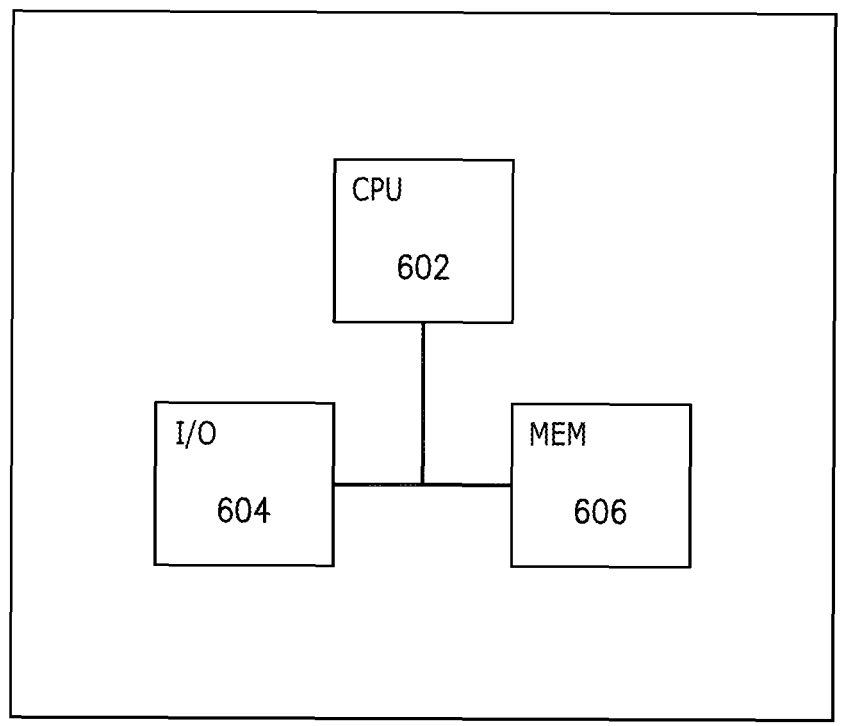
FIG. 6 illustrates an example of an apparatus in accordance with an aspect of the disclosure.

FIG. 6 depicts a high-level block diagram of a computing apparatus 600 for implementing processing devices 104, 106 of system 100. Apparatus 600 comprises a processor 602 (e.g., a central processing unit ("CPU")), that is communicatively interconnected with various input/output devices 604 and a memory 606.

The processor 602 may be any type of processor such as a general purpose central processing unit ("CPU") or a dedicated microprocessor such as an embedded microcontroller or a digital signal processor ("DSP"). The input/output devices 604 may be any peripheral device operating under the control of the processor 602 and configured to input data into or output data from the apparatus 600, such as, for example, network adapters, data ports, video cameras, microphones, speakers, etc. and various user interface devices such as a keyboard, a keypad, a mouse, a display, etc.

Memory 606 may be any type of medium suitable for storing electronic information, such as, for example, random access memory (RAM), non-transitory read only memory (ROM), non-transitory flash memory, non-transitory hard disk drive memory, compact disk drive memory or optical memory, etc. The memory 606 may non-transitorily store data and instructions which, upon execution by the processor 602, configure apparatus 600 to perform the functionality of the various modules 112-122 described above. In addition, apparatus 600 may also include an operating system, queue managers, device drivers, one or more network protocols, or other applications or programs that are stored in memory 606 and executed by the processor 602.

The systems and methods disclosed herein may be implemented in software, hardware, or in a combination of software and hardware. For example, in various other aspects the one or more of the modules disclosed herein, such as the sound-source localization module 112, the beamformer module 114, the angle-computation module 116, and the talker-computation module 118 of the processing device 104, as well as the pre-processing module 120 and the panning module 122 of the processing device 106, may also be implemented using one or more application specific integrated circuits (ASICs), field programmable gate arrays (FPGAs), or any other combination of hardware or software.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. A system for enabling an audio conference between conference participants situated at remote locations, the system comprising:
    a microphone array including at least a first microphone and a second microphone for detecting sounds from one or more conference participants situated at a first location; and,
    a transmitting device communicatively coupled to the first microphone and the second microphone, the transmitting device being configured to:
        determine a time-of-arrival delay between at least a first audio signal generated by the first microphone and at least a second audio signal generated by the second microphone in response to the sounds detected at the first location;
        generate a third audio signal and spatial data associated with the third audio signal based on the determined time-of-arrival delay; and,
        transmit the third audio signal and the spatial data to the second location over a network;
    wherein the generated spatial data includes a conference-participant identifier determined by the transmitting device based on the time-of-arrival delay, and the conference-participant identifier is determined by the transmitting device based on a conversion of the time-of-arrival delay into an angular value.

2. The system of claim 1, wherein the second audio signal generated by the second microphone is a time-delayed version of the first audio signal generated by the first microphone.

3. The system of claim 1, wherein the transmitting device is configured to compute a cross-correlation between at least the first audio signal and the second audio signal to determine the time-of-arrival delay.

4. The system of claim 1, wherein the third audio signal is a beam-formed monaural audio signal generated by the transmitting device by combining at least the first audio signal and the second audio signal based on the time-of-arrival delay.

5. The system of claim 1, wherein the generated spatial data includes an angular value determined by the transmitting device from the time-of-arrival delay.

6. The system of claim 1, wherein the generated spatial data includes a count of conference-participants that are detected by the transmitting device at the first location.

7. The system of claim 6, wherein the count of conference-participants at the first location is determined by detecting a number of changes in the time-of-arrival delay or in an angular value derived from the time-of-arrival delay.

8. The system of claim 1, wherein the transmitting device is further configured to perform voice recognition or facial recognition to determine an actual identity of a conference participant for inclusion in the generated spatial data.

9. The system of claim 1, further comprising:
    a receiving device configured to:
        receive the third audio signal and the spatial data over the network;
        process the third audio signal based on the spatial data to render a spatial audio signal; and,
        to output the spatial audio signal via speakers to one or more conference participants situated at the second location.

10. The system of claim 9, wherein the receiving device is further configured render the spatial audio signal based on an angular value included in the spatial data.

11. The system of claim 9, wherein the receiving device is further configured to render the spatial audio signal based on a conference participant identifier included in the spatial data.

12. The system of claim 9, wherein the receiving device is further configured to render the spatial audio signal based on a count of conference participants identified in the spatial data.

13. The system of claim 9, wherein the third audio signal received by the receiving device is a beam-formed monaural audio signal based on the first audio signal and the second audio signal.

14. The system of claim 9, wherein the receiving device is further configured to translate a first angular value received in the spatial data into a second angular value and to render the spatial audio signal based on the second angular value.

15. The system of claim 14, wherein receiving device is further configured to translate the first angular value into the second angular value based on a count of conference participants included in the spatial data.

16. A method for enabling an audio conference between conference participants situated at remote locations, the method comprising:
   determining, using a processor, a time-of-arrival delay between at least a first audio signal generated by a first microphone and at least a second audio signal generated by a second microphone in response to sounds detected at a first location;
   generating a third audio signal based on the first audio signal, the second audio signal, and the determined time-of-arrival delay;
   generating spatial data associated with the third audio signal based on the determined time-of-arrival delay, wherein the generated spatial data includes a conference-participant identifier determined based on the time-of-arrival delay, and the conference-participant identifier is determined based on a conversion of the time-of-arrival delay into an angular value; and,
   transmitting the third audio signal and the spatial data to the second location over a network.

17. The method of claim 16, wherein determining the time-of-arrival delay further comprises computing a cross-correlation between at least the first audio signal and the second audio signal.

18. The method of claim 16, wherein generating the third audio signal further comprises generating a beam-formed monaural audio signal by combining at least the first audio signal and the second audio signal based on the time-of-arrival delay.

19. The method of claim 16, wherein generating the spatial data further comprises generating a count of conference-participants detected at the first location.

20. The method of claim 19, wherein generating the count of the conference-participants detected at the first location further comprises detecting a number of changes in the time-of-arrival delay or an angular value determined based on the time-of-arrival delay.

21. The method of claim 16, further comprising:
   receiving the third audio signal and the spatial data at the second location;
   rendering a spatial audio signal based on the third audio signal and the spatial data; and,
   outputting the spatial audio signal via speakers to one or more conference participants situated at the second location.

22. The method of claim 21, wherein the spatial audio signal is rendered based on an angular value included in the spatial data.

23. The method of claim 21, wherein the spatial audio signal is rendered based on a conference participant identifier included in the spatial data.

24. The method of claim 21, wherein the spatial audio signal is rendered based on a count of conference participants included in the spatial data.

25. The method of claim 21, wherein the spatial audio signal is rendered based on a user preference.

* * * * *